United States Patent [19]

LoMaglio

[11] Patent Number: 4,526,133
[45] Date of Patent: Jul. 2, 1985

[54] ANIMAL ISOLATION CAGE WARD

[75] Inventor: F. Leo LoMaglio, Kansas City, Mo.

[73] Assignee: Schroer Manufacturing Co., Inc., Kansas City, Mo.

[21] Appl. No.: 586,191

[22] Filed: Mar. 5, 1984

[51] Int. Cl.³ .............................................. A01K 1/03
[52] U.S. Cl. ....................................... 119/17; 119/15
[58] Field of Search ....................... 119/15, 17, 18, 19, 119/21, 31, 37

[56] References Cited

U.S. PATENT DOCUMENTS

| | | | |
|---|---|---|---|
| 3,396,702 | 8/1968 | Trussell | 119/17 |
| 3,630,174 | 12/1971 | Runkle et al. | 119/15 |
| 3,698,360 | 10/1972 | Rubricius | 119/17 |
| 3,749,061 | 7/1973 | Connelly | 119/17 X |
| 3,919,978 | 11/1975 | Schaefer | 119/19 |
| 3,924,571 | 12/1975 | Holman | 119/19 X |
| 4,023,529 | 5/1977 | Landy | 119/15 |
| 4,085,705 | 4/1978 | Gland et al. | 119/17 |
| 4,216,741 | 8/1980 | Moss | 119/15 |
| 4,249,482 | 2/1981 | Harr | 119/17 |
| 4,305,347 | 12/1981 | Hemenway et al. | 119/15 |
| 4,340,859 | 7/1982 | Farley | 119/37 X |
| 4,343,261 | 8/1982 | Thomas | 119/17 X |
| 4,357,903 | 11/1982 | Moss et al. | 119/15 |
| 4,365,590 | 12/1982 | Ruggieri et al. | 119/15 |

Primary Examiner—Robert P. Swiatek
Attorney, Agent, or Firm—Litman, Day and McMahon

[57] ABSTRACT

An animal isolation cage ward has upper and lower confinement units positioned within a housing and mounted on wheels for mobility. The units are heated for animal comfort and have exhaust ports in each connecting to a plenum within the housing. An exhaust blower draws air inwardly through the units, through the exhaust port, and out through a duct for routing contaminated air outwardly. The cages are fitted with doors of transparent material which are slightly smaller than the door opening, so that a gap is maintained about the periphery of each of the doors for airflow into the unit. The size relationships are designed so that a slight negative pressure is maintained within each of the cage units for inward airflow. The housing is designed so that air from one unit does not contaminate the other unit. A high efficiency particulate matter filter can be installed in the exhaust duct.

9 Claims, 6 Drawing Figures

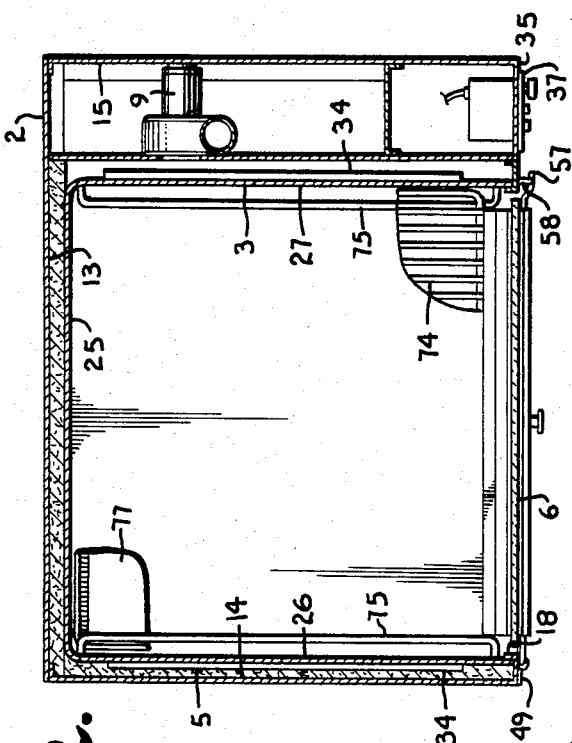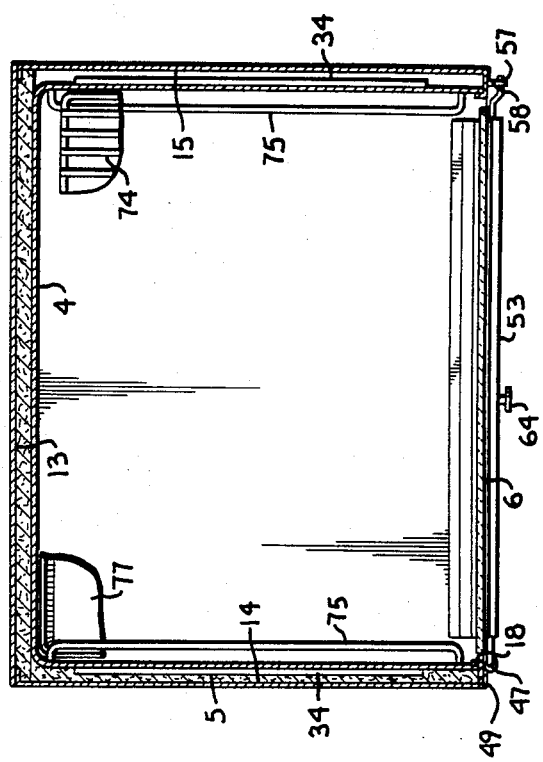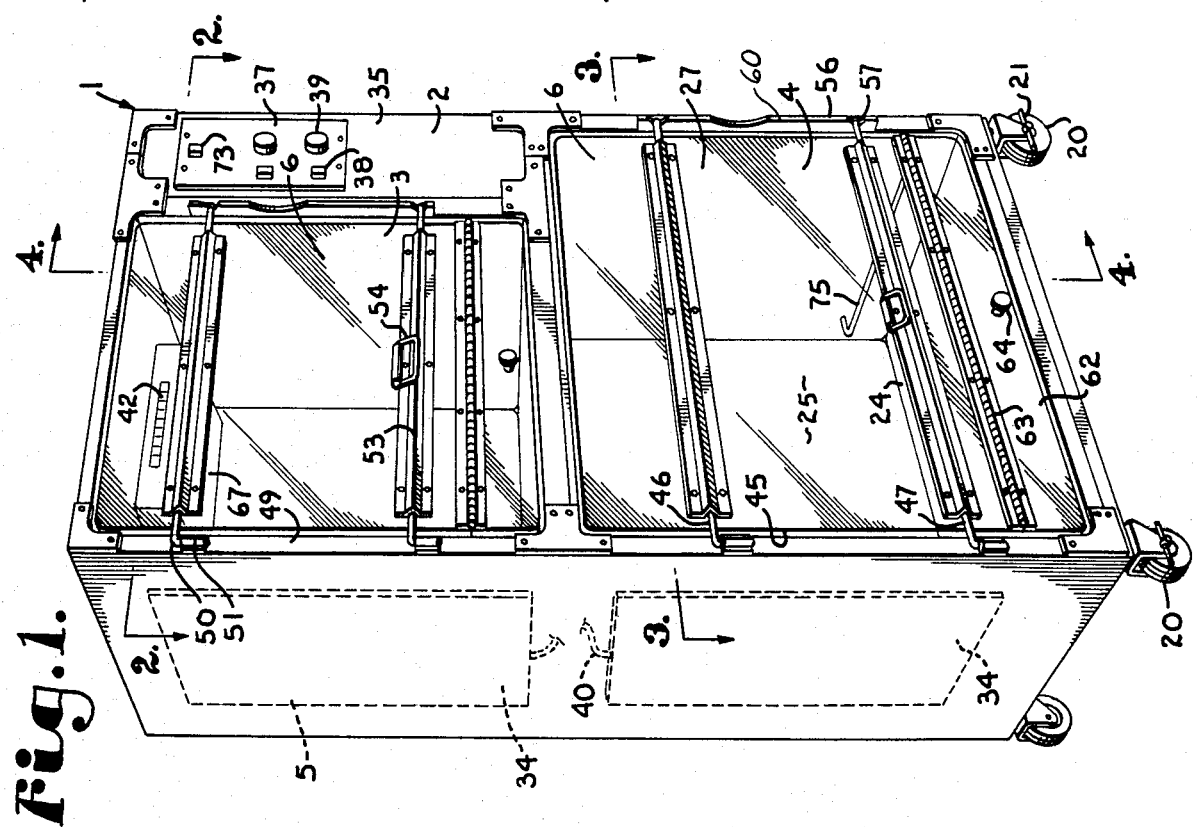

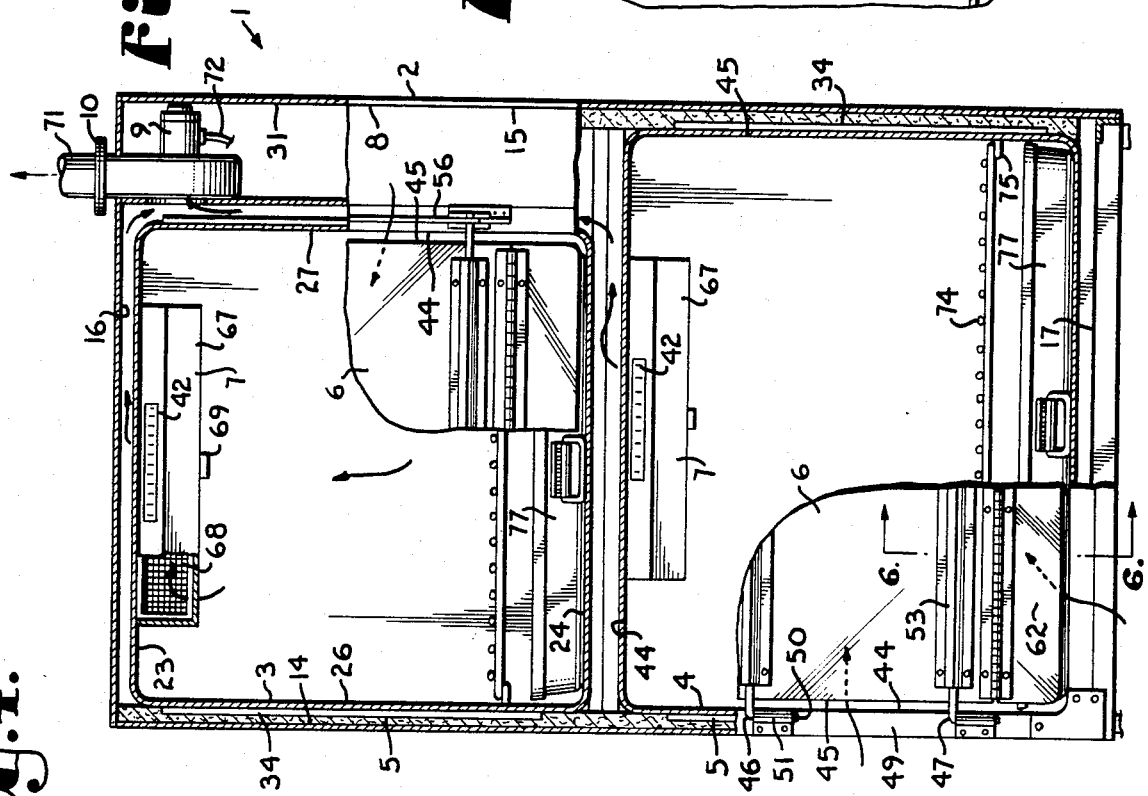
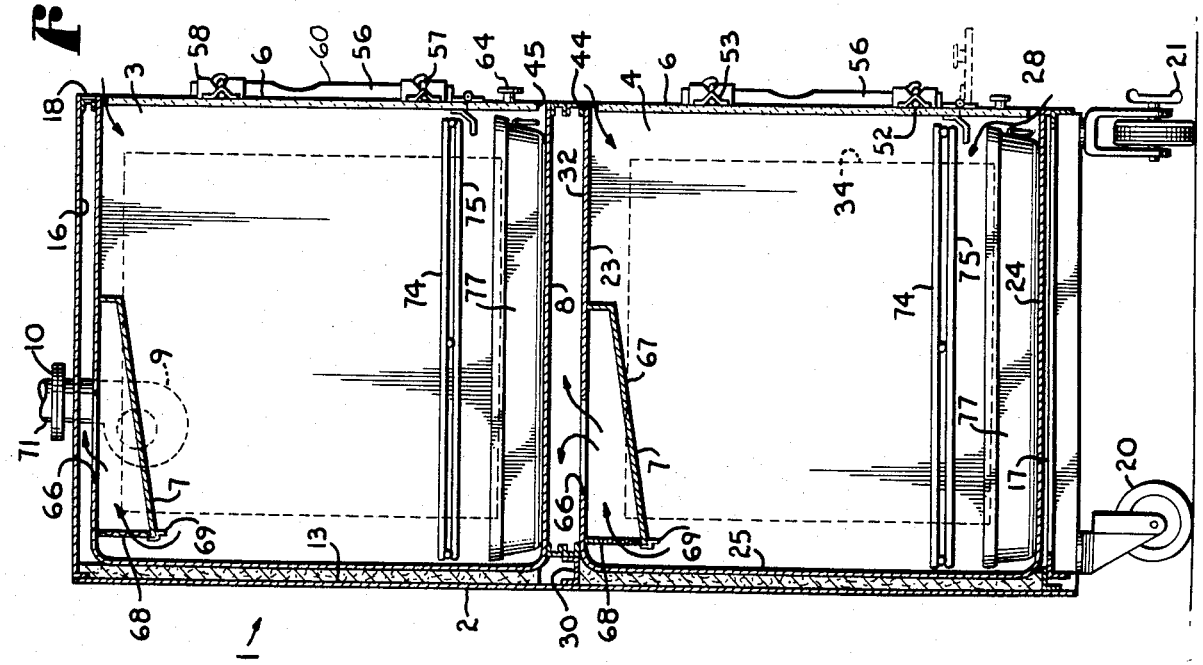

ANIMAL ISOLATION CAGE WARD

BACKGROUND OF THE INVENTION

This invention relates to a cage for animals which may be infected with diseases and in particular to a cage which inhibits the spread of infectious diseases from one animal to another.

SUMMARY OF THE INVENTION

In the typical veterinary practice, animals having various contagious diseases, such as distemper, may be kept for observation and treatment. While many inventors have addressed the problem of controlling the spread of infectious diseases for small laboratory animals, such as mice, gerbils or rabbits, few have addressed the problem of dealing with larger animals, such as dogs and cats, which are primarily household pets and unused to the unfamiliar surroundings of a veterinary clinic. Both the veterinary practitioner and the animal's owner are concerned about limiting the spread of infectious diseases from one animal to another and particularly of contaminating relatively well animals by a diseased animal.

In the veterinary clinic, typical precautions are normally taken; that is, floors are mopped daily or more often with disinfectant solutions and hands are usually washed between handling sick animals. Yet, these measures do not stop the spread of contagious diseases. In the veterinary clinic, diseases are normally spread by two means; airborne contaminates and contact with contaminated fecal material. Accordingly, a stack of wire cages is totally unsatisfactory because of the rain of fecal material on animals located beneath an upper cage or upper shelf in a cage. The addition of collection pans for the fecal material reduces the rain somewhat but allows contamination to remain a problem.

The instant invention is directed to the confinement unit for animals sick with infectious diseases which may be spread either by air or contact with fecal material. An airflow pattern is created within the unit which does not travel from one cage through another, and a fecal catch tray in combination with a cage enclosure is arranged to lessen cross contamination. Additionally, since the primary use of such a confinement unit must be to enable the sick animal to become well, as well as to reduce the risk of the sick animal infecting other animals, control heater units are installed to maintain the body temperature of the animal.

OBJECTS OF THE INVENTION

The principal objects of the present invention are: to provide an isolation cage ward for isolating animals carrying infectious diseases; to provide such a cage ward of which airflow from one cage does not pass through another to spread infection; to provide such a cage ward in which separate cages have solid sides and an air exhaust duct in each cage to carefully control the flow of air through the cage; to provide such a cage ward having individually controllable heater units for each cage for animal comfort; to provide such a cage ward which is mounted on wheels for mobility; to provide such a cage ward which includes filters for removing particulate matter from exhaust airflow; to provide such a cage ward having doors through which animals can be easily observed; to provide such a cage ward designed so that a slight negative pressure is created within each one of the cage units without need for an unduly large blower, enabling relatively low noise levels and cost of operation; and to provide such an isolation cage ward which is relatively inexpensive, sturdy and efficient in use and particularly well adapted for the intended purpose.

Other objects and advantages of this invention will become apparent from the following description taken in conjunction with the accompanying drawings wherein are set forth, by way of illustration and example, certain embodiments of this invention.

BRIEF DESCRIPTION OF THE DRAWINGS

FIG. 1 is a perspective view of an animal isolation cage ward embodying the present invention.

FIG. 2 is a cross-sectional view taken along lines 2—2, FIG. 1.

FIG. 3 is a cross-sectional view taken along lines 3—3, FIG. 1.

FIG. 4 is a longitudinal sectional view taken along lines 4—4, FIG. 1.

FIG. 5 is a fragmentary, front elevational view.

FIG. 6 is a fragmentary, sectional view taken along lines 6—6, FIG. 5.

DETAILED DESCRIPTION OF THE PREFERRED EMBODIMENT

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1, FIGS. 1, 4 and 5, generally indicates an animal isolation cage ward embodying the present invention and including a housing 2 with upper and lower confinement units 3 and 4 mounted in the housing 2 and with heater means 5 in conjunction with the confinement units 3 and 4 for keeping the units warm for the comfort and stability of the diseased animals. Doors 6 of transparent material are mounted over the open fronts of each of the units 3 and 4 and are slightly smaller than each unit's open front to retain a gap around the periphery of each of the doors 6 for airflow into the units. Each of the units has an exhaust port means 7 and a plenum 8 within the housing communicates with the exhaust port means 7. An exhaust blower 9 is mounted in the housing 2 and draws air through the plenum 8, the exhaust port means 7 and the units 3 and 4 from atmosphere exterior of the housing to create a slight negative pressure within the units 3 and 4. Finally, a duct end connection 10 to the exhaust blower 9 routes contaminated air outwardly.

In the illustrated example, the housing 2 is generally rectangular and has a back wall 13, opposite side walls 14 and 15, top and bottom walls 16 and 17, and an open front 18, FIGS. 2, 3, 4 and 5. The housing 2 is mounted on wheels 20, FIGS. 1 and 4, for mobility. In the illustrated example, the wheels 20 are swivelable and have locks 21 to selectively maintain the housing in position on a floor.

A plurality of confinement units are fitted into the housing 2 and in the illustrated example, include the upper and lower confinement units 3 and 4. Each of the units 3 and 4 includes a top wall 23, bottom wall 24, back wall 25, opposite side walls 26 and 27, and an open front 28. Each unit 3 and 4 is mounted within the housing 2 so that the open fronts 28 coincide with the housing open front 18. The confinement units 3 and 4 are mounted in stacked relationship within the housing 2 and support brackets 30, FIG. 4, extending between the walls of the housing 2 provide support for the upper confinement unit 3.

The upper confinement unit 3 is of smaller size than the lower confinement unit 4 and retains a space 31 between the unit side wall 27 and the housing side wall 15 for airflow circulation. Other spaces between the units 3 and 4 and the housing 2 are filled with insulation. A second space 32, FIG. 4, is maintained between the upper and lower units 3 and 4 for airflow circulation and communicates with the side space 31.

Preferably, the housing 2 and the confinement units 3 and 4 are fabricated of sheet stainless steel which presents a clean and shiny appearance, remains rust-free and is easy to clean. Corners are preferably rounded, particularly corners of the units 3 and 4 to not provide gathering places for germs.

For animal comfort, the heater means 5 are mounted to each of the units 3 and 4. In the illustrated example, the heater means 5 are resistance heating pads 34 taped or otherwise mounted to the opposite side walls 26 and 27 of each of the units 3 and 4 and located to the exterior of the unit, e.g., between the wall of the unit and the adjoining wall of the housing. A facia plate 35 is mounted over the space 31 adjacent the upper confinement unit 3 and has a control panel 37 mounted on same and containing switches 38 and rheostats 39 for each of the units 3 and 4. The control panel 37 is connected by electrical lines 40 to the resistance heating pads 34. Thermometer strips 42 of heat sensitive material are mounted in each of the units 3 and 4 and are used to monitor temperature within the unit for control by an operator. Heat from the resistance heating pads 34 conducts through the unit side walls 26 and 27 to warm the inside of the units and provide better care for the sick or injured animal.

The open fronts 28 of the confinement units 3 and 4 are closed by the respective doors 6. In the illustrated example, each door 6 is of a durable transparent material, such as plexiglass, and is of a total size slightly smaller than the unit open front 28, thereby maintaining a gap in the nature of one-quarter inch around the periphery 45 of the door 6.

Upper and lower hinges 46 and 47 connect each door 6 to a housing wall strip 49. Each of the hinges 46 and 47 is an elongate stainless steel rod extending across the width of the door 6 and having a downturned end 50 received within a hinge holder 51. The remainder of the rod is secured to the door 6 by elongate strips 53 which have a handle 54 attached for grasping and pulling open the door. A clasp 56 is located on another side of the hinge rod 52 and includes ball ends 57 on the hinge rod 52 which are received into V-shaped receptacles 58 and enclosed by an elongate sliding bar 60 extending through the V-shaped receptacle 58 and including locking teeth which fit over the ball ends 57. The sliding bar 60 extends through upper and lower receptacles 58 and therefore manipulation of the bar 60 will open both catches at once for swinging the door 6 open.

A lower door section 62, FIG. 6, is connected by a hinge 63 to the remainder of the door 6 and has a knob 64 for grasping and pulling upwardly to gain access to a lower part of the confinement unit 3 or 4. An interior, downwardly slanted lip 65 is positioned on the interior side of the door 6 and generally coincident with the hinge 63 for deflecting urine and other waste of the animal from the hinge 63 and into a receptacle hereinafter described.

An exhaust port means 7 is situated in each of the units 3 and 4 and in the illustrated example, includes an opening 66 through the unit top wall 23 and a slanting cover 67 thereover. The cover 67 conceals a rearwardly mounted filter or screen 68 to filter particulate matter and which is easily removed from the cover 67 for cleaning by a pull tab 69. From the opening 66, air is pulled through the plenum 8, defined by the spaces 32 and the space 31 between the housing 2 and the units 3 and 4. The exhaust blower 9 is mounted within the space 32 and situated adjacent the housing top wall 16. In the illustrated example, the exhaust blower 9 is of the centrifugal type and includes a blower motor and "squirrel cage" rotary fan. Electrical lines 72, FIG. 5, lead from the exhaust blower 9 to a switch 73, FIG. 1, on the control panel 37 for turning on and off the blower 9. Air is exhausted through the duct connection 10 for connection to an exhaust duct 71. A high efficiency particulate air filter (HEPA) may be installed in the exhaust duct 71 as necessary for filtering particularly fine matter.

To maintain the animal in sanitary conditions within the confinement units 3 and 4, the animal rests upon a cage or grill floor 74, consisting of a network of heavy gauge wire rods is supported on holders 75, FIG. 1, affixed to the respective side walls 26 and 27. A waste collection pan 77, FIG. 4, is located beneath the grill floor 74 and is dimensioned so that the lower door section 62 can be swung upwardly and the pan 77 pulled from the unit 3 or 4. The waste collection pan 77 may be lined with a plastic bag or other such means to promote ease of sanitary removal of fecal material.

In use, a diseased animal is placed within either of the confinement units 3 and 4 where it rests comfortably upon the grill floor 74 and warmed as necessary by the heater means 5. The switch 73 is turned on to activate the exhaust blower 9 which causes air to be pulled from atmosphere exterior of the animal isolation cage ward 1 into the units 3 and 4, through the exhaust port means 7, through the plenum 8, and out through the duct connection 10. The animal remains visible at all times through the doors 6, and air courses around the periphery 45 of the doors 6 and through the gaps 44 between the unit walls and the door periphery 45. Because the doors 6 close much of the frontal area of each of the units 3 and 4, a slight negative pressure is created within each of the units 3 and 4 at relatively low power and noise levels of the blower 9. Particulate matter is screened first as it leaves each of the units 3 and 4 by the screen or filter 68 and may be screened further by a HEPA filter and a suitable installation kit in the exhaust duct 71. Low velocity air entering each of the units 3 and 4 is exhausted by the negative pressure and air from one of the units 3 or 4 does not enter the other unit. Finally, the waste collection pan 77 is easily removable through the separate lower door section 62, and waste from one unit is prevented from contacting the interior of the other unit to spread infectious diseases.

It is to be understood that while certain forms of the present invention have been illustrated and described herein, it is not to be limited to the specific form or arrangement of parts described and shown, except insofar as such limitations are included in the following claims.

What is claimed and desired to be secured by Letters Patent is as follows:

1. An animal isolation cage ward comprising:
   (a) a housing having an open front;
   (b) a confinement unit mounted in said housing and having enclosing walls and an open front coinciding with said housing open front;
   (c) a door of substantially impervious material mounted over and substantially filling said unit open front and being slightly smaller than said unit open front and having a narrow gap around a periphery of said door for airflow into said unit;
   (d) an exhaust port in said unit;
   (e) a plenum within said housing communicating with said exhaust port;
   (f) an exhaust blower mounted in said housing for drawing air through said plenum, said exhaust port, said unit and around said door from atmosphere exterior of said housing; and
   (g) a duct connection to said exhaust blower for routing contaminated air outwardly.

2. The isolation cage ward set forth in claim 1 wherein:
   (a) said door is impervious to passage of air therethrough; and
   (b) said door is of a transparent plastic material.

3. The isolation cage ward set forth in claim 1 including:
   (a) wheels mounted to an underside of said housing for mobility over a floor surface.

4. The isolation cage ward set forth in claim 1 wherein:
   (a) said door has a hinged lower section for selective access to a lower section of said unit.

5. An animal isolation cage ward comprising:
   (a) a housing having a back wall, opposite side walls, top and bottom walls and an open front; said housing being mounted on wheels for mobility;
   (b) upper and lower confinement units mounted in said housing with each of said units including top, bottom, back and opposite side walls and an open front spaced from said housing back, opposite side and top and bottom walls and with said open front of each of said units coinciding with said housing open front;
   (c) heater means mounted on said opposite side walls of said confinement units for warming said units;
   (d) doors of impervious transparent material respectively mounted over and substantially filling the open front of each of said units; said doors being slightly smaller than said units open front and having a narrow gap around the periphery of each of said doors for airflow into said units;
   (e) exhaust port means in said units;
   (f) a plenum within said housing communicating with said exhaust port means;
   (g) an exhaust blower mounted in said housing for drawing air through said plenum, said exhaust port means, said units and around said doors from atmosphere exterior of said housing; and
   (h) a duct connection to said exhaust blower for routing contaminated air outwardly.

6. The isolation cage ward set forth in claim 5 wherein:
   (a) said heater means are electrical resistance heating pads; and including
   (b) a thermometer mounted in each of said units for indicating temperature.

7. The isolation cage ward set forth in claim 5 including:
   (a) a cover mounted over each of said exhaust port means;
   (b) said cover having a detachable and replaceable filter element therewith.

8. The isolation cage ward set forth in claim 5 wherein:
   (a) said plenum extends between said upper and lower units and along a side wall of said upper confinement unit; and
   (b) said exhaust blower is mounted in said plenum beside of a side wall of said upper confinement unit.

9. An animal isolation cage ward comprising:
   (a) a generally rectangular housing having a back wall, opposite side walls, top and bottom walls and an open front; said housing being mounted on wheels for mobility;
   (b) upper and lower confinement units mounted in said housing with each of said units including top, bottom, back and opposite side walls and an open front, said units being spaced from said housing back, opposite side and top and bottom walls and with said open front of each of said units coinciding with said housing open front;
   (c) said lower confinement unit being larger than said upper confinement unit;
   (d) resistance heating pads mounted to said opposite side walls of said units and with a temperature control panel situated on said housing adjacent said upper unit;
   (e) doors of impervious synthetic transparent plastic material respectively mounted over the open fronts of said units from a said side wall thereof, said doors being slightly smaller than said units open fronts and having a gap around the periphery of each of said doors for airflow into said units;
   (f) said doors respectively having a bottom hinged section swingably mounted to said doors for access to an interior of said units without opening said doors;
   (g) exhaust port means extending through the respective top walls of each of said units;
   (h) a plenum within said housing extending along the top walls of said units and along said side wall of said upper unit;
   (i) an exhaust blower mounted in said housing for drawing air through said plenum; said exhaust port means, said units and around said doors from atmosphere exterior of said housing;
   (j) a duct connection to said exhaust blower for routing contaminated air outwardly; and
   (k) a filter at said duct connection for trapping particulate matter.

* * * * *